(12) United States Patent
Guzik et al.

(10) Patent No.: US 11,785,338 B1
(45) Date of Patent: Oct. 10, 2023

(54) INITIATING CONTENT CAPTURE BASED ON PRIORITY SENSOR DATA

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: WHP Workflow Solutions, Inc., North Charleston, SC (US); Getac Technology Corporation, Taipei (TW)

( * ) Notice: Subject to any disclaimer, the term of this patent is extended or adjusted under 35 U.S.C. 154(b) by 0 days.

(21) Appl. No.: 17/863,107

(22) Filed: Jul. 12, 2022

(51) Int. Cl.
*H04N 23/60* (2023.01)
*H04N 7/18* (2006.01)
*H04N 23/50* (2023.01)

(52) U.S. Cl.
CPC ........... *H04N 23/665* (2023.01); *H04N 7/185* (2013.01); *H04N 23/50* (2023.01); *H04N 23/64* (2023.01)

(58) Field of Classification Search
CPC ..... H04N 2201/0055; H04N 2201/006; H04N 1/00103–00108; H04N 1/00315; H04N 5/3454; H04N 7/183; H04N 5/2252; H04N 5/23218; H04N 5/23206; G06F 1/1698; G06F 2213/3814; G06F 9/50; G06F 1/163; F41A 35/00; F41A 17/063; G06Q 50/26
USPC ................. 396/56–59; 361/679.03; 224/243
See application file for complete search history.

(56) References Cited

U.S. PATENT DOCUMENTS

2021/0136277 A1\* 5/2021 McFarlane ............ H04N 23/61

\* cited by examiner

*Primary Examiner* — Xi Wang
(74) *Attorney, Agent, or Firm* — Han Santos, PLLC

(57) ABSTRACT

Described herein are techniques that may be used to enable automatic collection or capture of media content by a content capture device based on detection of priority conditions, such as an unholstering event. Such techniques may comprise obtaining, from one or more sensors installed within a holster device oriented proximate to a space into which an object is inserted, sensor data indicating position information for the object, determining, based on the sensor data, that the object is being withdrawn from the space, determining, based on the withdrawal of the object, that media content should be collected, and upon determining that media content should be collected, causing the content capture device to begin collecting media content.

20 Claims, 6 Drawing Sheets

INITIATING CONTENT CAPTURE BASED ON PRIORITY SENSOR DATA

BACKGROUND

In recent years, a number of events have highlighted the need for increased recordkeeping for law enforcement officers. This need pertains to evidentiary collection, protecting the public from potential abuses by a police officer, as well as protecting the police officer from false accusations of abuse. Law enforcement often uses various sensor devices for capturing data relating to events, such as body-worn camera devices, patrol vehicle cameras, audio recorders and the like, all as a means of reducing liability, increasing public confidence and documenting evidence.

While the use of content capture devices, like body-worn cameras, can provide peace of mind, these devices may not necessarily be configured to continuously capture content. Indeed, rather than continually capturing and storing eight, ten or more hours of content, much of which might be mundane and meaningless, these content capture devices are more typically configured such that an officer must activate them to capture or record critical content. However, for a law enforcement officer, a seemingly innocuous situation that might not need recordation by a content capture device can quickly escalate into a high priority, volatile situation requiring all of the officer's attention. Of course, in this instance, it becomes important to capture/record the situation. However, under these emergent circumstances, activating the record option of one or more content capture devices may not be on the forefront of that officer's mind, which may result in a failure to initiate the recording feature of a device to capture important information.

SUMMARY

Techniques are provided herein for automatically initiating recordation by one or more content capture devices. In some embodiments, signal data regarding an emergent condition is received. In some instances, the emergent condition may correspond to a priority condition such that content capture should be immediately initiated on the one or more content capture devices. For example, and way of illustration and not limitation, the signal data may correspond to the unholstering of a handgun or a conductive energy device (CED) such as a Taser® by a law enforcement officer. Upon receiving the signal data, a determination is made regarding whether the corresponding emergent condition, i.e., the unholstering of a device, meets a threshold for activating a recording feature of one or more content capture devices. Upon determining that the threshold is met the one or more content capture devices are activated to capture or record. Of course, in nearly every situation unholstering of a handgun or a CED would be viewed as a priority condition and, according to aspects of the disclosed subject matter, automatically initiate recordation by one or more content capture devices.

In one embodiment, a method is disclosed as being performed. The method comprises receiving signal data from one or more sources corresponding to an emergent condition with respect to the current actions and/or location of a person, such as a law enforcement officer. As part of the method, an examination of the signal data is made and, upon determining that the emergent condition identified by the signal data corresponds to a priority condition, one or more content capture devices corresponding to that person are automatically activated to capture or record content.

In one embodiment, a system comprising a holster device and a content capture device is presented. In such a system, the holster device is configured to holster a holstered object, e.g., a CED, and the holster device comprises one or more sensors capable of obtaining position information associated with the holstered object with respect to the holster device. The holster device further comprises a communication interface configured to enable communication between the holster device and the content capture device, such that the holster device may transmit object position information obtained from the one or more sensors to the content capture device as signal data. In such a system, the content capture device comprises one or more input sensors configured to record or capture media content. Additionally, the content capture device comprises a processor, and a memory including instructions that, when executed with the processor, can cause the content collection device to, at least, detect the signal data, determine whether the emergent condition corresponds to a priority condition, and upon determining that the signal data corresponds to a priority condition, activate the one or more sensors of the content capture device to collect and record media content.

An embodiment is directed to a non-transitory computer-readable media collectively storing computer-executable instructions that, upon execution, cause one or more computing devices to perform acts comprising obtaining, from one or more sensors installed within a holster device into which a holstered object is inserted, receiving signal data of an emergent condition indicating position information of the holstered object relative to the holster device, determining, based on the position information of the holstered object, that the holstered object is being withdrawn from the holster device, determining, that the withdrawal of the holstered object from the holster device is a priority condition, and upon determining that that the signal data is a priority condition, causing a content capture device to begin collecting media content.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
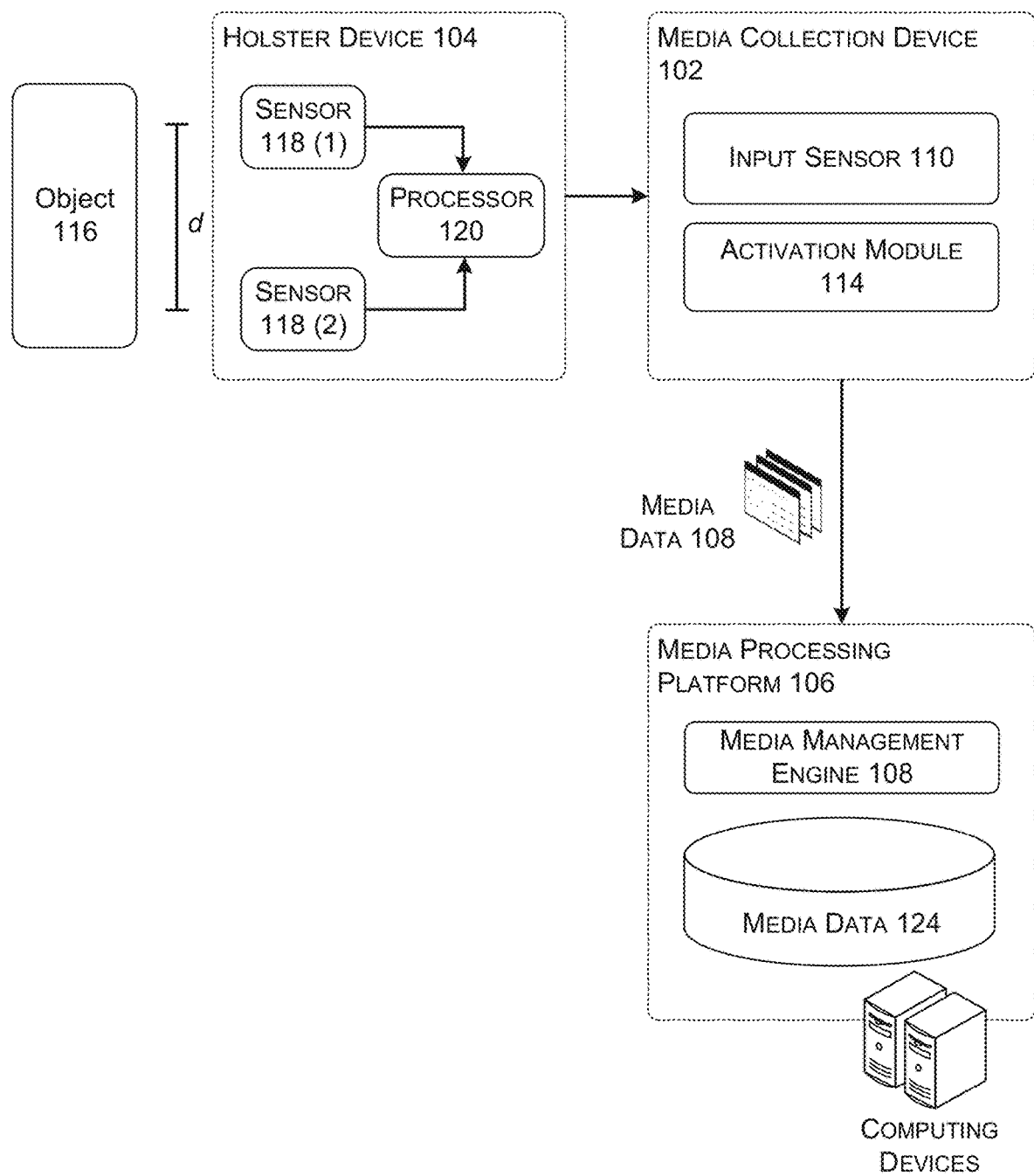
FIG. 1 illustrates an environment in which an unholstering event may be detected, which triggers the automatic activation of a content capture device to record media content, all in accordance with at least some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

It should be appreciated that, while various exemplary aspects of the disclosed subject matter are set forth in the discussion of at least some of the figures, especially in regard to the unholstering of a holstered object, this example is illustrative and not limiting. As will be set forth in additional detail below, aspects of the disclosed subject matter may be applied to a variety of emergent, priority conditions which may occur among a plurality of persons, including law enforcement officers.

Described herein are techniques that may be used to automate activation of a content capture device in the case of an emergent, priority condition. Moreover, for illustration purposes and by way of example and not limitation, an emergent, priority condition may correspond to the unholstering of a holstered object. In such techniques, sensor data may be received from a number of sensors installed within a holster device that indicates the holstered object is being withdrawn from the holster device. Based on sensing the withdrawal of the holstered object, signal data may be sent to a content collection device. The signal data may include information identifying the emergent condition: the holstered object being withdrawn from the holster device. In response to the signal data, the target content collection device determines that the emergent condition (unholstering the holstered object) is a priority condition and executes instructions that cause the content capture device to begin recording media content. In some embodiments, the recordation of media content by the content capture device continues until signal data is received with information indicating an emergent condition, particularly that the holstered object is replaced in the holster device.

Embodiments of the disclosure provide several advantages over conventional techniques. For example, embodiments of the proposed system provide for automated activation of a content capture device upon receipt and/or detection of an emergent, priority condition. Signal data corresponding to the emergent condition may come from sensors associated with the wearer of the content capture device, or from another source including another person, a signal dispatched from a remote source, and the like. Irrespective of the source of the signal data, aspects of the disclosed subject matter allow a wearer of the content capture device to focus on the current situation, including a priority condition, that he or she is faced with without having to manually activate the content capture device to capture media content. Additionally, such a system can provide security to a manager or employer of an operator of the content capture device by ensuring that the content capture device is activated to capture media content when such an emergent, priority condition occurs.

FIG. 1 illustrates an environment in which an unholstering event may be detected, which triggers the automatic activation of a content capture device to record media content, in accordance with at least some embodiments. As depicted in FIG. 1, environment 100 may include one or more content capture devices, including content capture device 102. In this environment 100, the content capture device 102 is configured to receive communications from holster device 104, and to further communicate with a media processing platform 106. According to aspects of the disclosed subject matter, media processing platform 104 that may comprise a number of computing devices. In the environment 100, content capture device 102 may be configured to transmit captured media content 112 to the media processing platform. Transmission of the captured media content 112 may be sent directly to the media processing platform 106 from the content capture device 102, as shown in environment 100, or may be transmitted to an intermediate device or devices that subsequently deliver the media content to the media processing platform. According to various embodiments of the disclosed subject matter, the captured media content may comprise some combination of digital images, video and/or audio data.

In the environment 100 depicted in FIG. 1, a content capture device, such as content capture device 102, may comprise any suitable electronic device capable of being used to collect, record and/or capture media content or data related to an environment surrounding the content capture device. In some cases, the content capture device may be an audio recorder or video camera mounted within a vehicle. In some cases, the content capture device may be a device that is capable of being worn or otherwise mounted or fastened to a person. In some embodiments, the content capture device may be a surveillance camera, such as a surveillance camera that is included within a security system.

The content capture device 102 may include at least one input sensor 110, such as a microphone and/or camera, with corresponding and supporting logic and circuitry, capable of recording media content and data from the environment in which the content capture device is located. Each content capture device may be configured to collect a variety of media content or data, such as images, audio, and/or video. In some embodiments, one or more of the content capture devices may be operated by an entity that is unaffiliated with the media processing platform 106. In some embodiments, the content capture devices may have a plurality of sensors that include a temperature sensor, a real-time clock (RTC), a global-positioning system (GPS), an inertial measurement unit (IMU), or any other suitable sensor. An IMU may be any electronic device that measures and reports a device's specific force, angular rate, and sometimes the orientation of the device, using a combination of accelerometers, gyroscopes, magnetometers and other sensors.

In some embodiments, the content capture device 102 may include an activation module 114 that is configured to activate the collection of media content via the input sensors. In the example of a holstered object, the activation module may be configured to activate the one or more input sensors upon receiving information from a holster device 104. In some embodiments, the activation module 114 may be configured to activate the one or more input sensors upon determining, based on received signal data of an emergent, priority condition, i.e., that an object 116 (e.g., a holstered object) has been unholstered from the holster device 104. In some embodiments, such an activation may occur if the object 116 was unholstered at a speed exceeding a predetermined threshold as may be indicated in the signal data.

The holster device 104 may include any suitable electronic device configured to detect a movement, and in some cases a rate of movement, of an object 116 holstered within, and withdrawn from the holster device. Such a holster device 104 may include a number of sensors 118 (e.g., sensor 118(1) and sensor 118(2)) in communication with a processor 120. The processor may receive data from one or more of the sensors 118 indicating the presence of, or lack of a presence of, the object 116. In some embodiments, such sensors may include inductive proximity sensors capable of detecting the presence of metallic objects. In some embodiments, each of the sensors may be separated by a distance d. In these embodiments, a rate of movement may be determined for an object based on the distanced divided by a difference in times at which each of sensors detect a start of an absence/presence of the object.

The media processing platform 106 can include any computing device configured to perform at least a portion of the operations described herein. Media processing platform 106 may be comprises of one or more general purpose computers, specialized server computers (including, by way of example, PC (personal computer) servers, UNIXTM servers, mid-range servers, mainframe computers, rack-mounted servers, etc.), server farms, server clusters, or any other appropriate arrangement and/or combination. Media processing platform 106 can include one or more virtual machines running virtual operating systems, or other computing architectures involving virtualization such as one or more flexible pools of logical storage devices that can be virtualized to maintain virtual storage devices for the computer.

The media processing platform 106 may be configured to receive media content from content capture devices, such as content capture device 102. More particularly, each of the content capture devices may be configured to transmit media content captured via a one or more sensors to the media processing platform, either directly or indirectly, over an established communication session. Media content may comprise any suitable series of content and/or data samples collected via any suitable type of content capture device. For example, a content capture device may be configured to transmit streaming video and/or audio data to the media processing platform 106. In another example, a content capture device may be configured to transmit a series of still images captured at periodic intervals.

According to aspects of the disclosed subject matter, the media processing platform 106 is configured to manage media content received from one or more content capture devices, such as content capture device 102. In environment 100, when the media processing platform receives media content from a content capture device, the received media content may be stored in a data store, e.g., media data 124 database.

In some alternative embodiments, the media processing platform 106 may be configured to receive information directly from a content capture device, such as holster device 104 and, based on the information received, generate signal data of an emergent, high priority condition to cause the content capture device 102 to activate recordation or collection of media content. In these embodiments, the media processing platform 106 may generate the signal data and transmit that signal data directly to the content capture device.

For clarity, a certain number of components are shown in FIG. 1. It is understood, however, that embodiments of the disclosure may include more than one of each component. In addition, some embodiments of the disclosure may include fewer than or greater than all of the components shown in FIG. 1.

Figure 2:
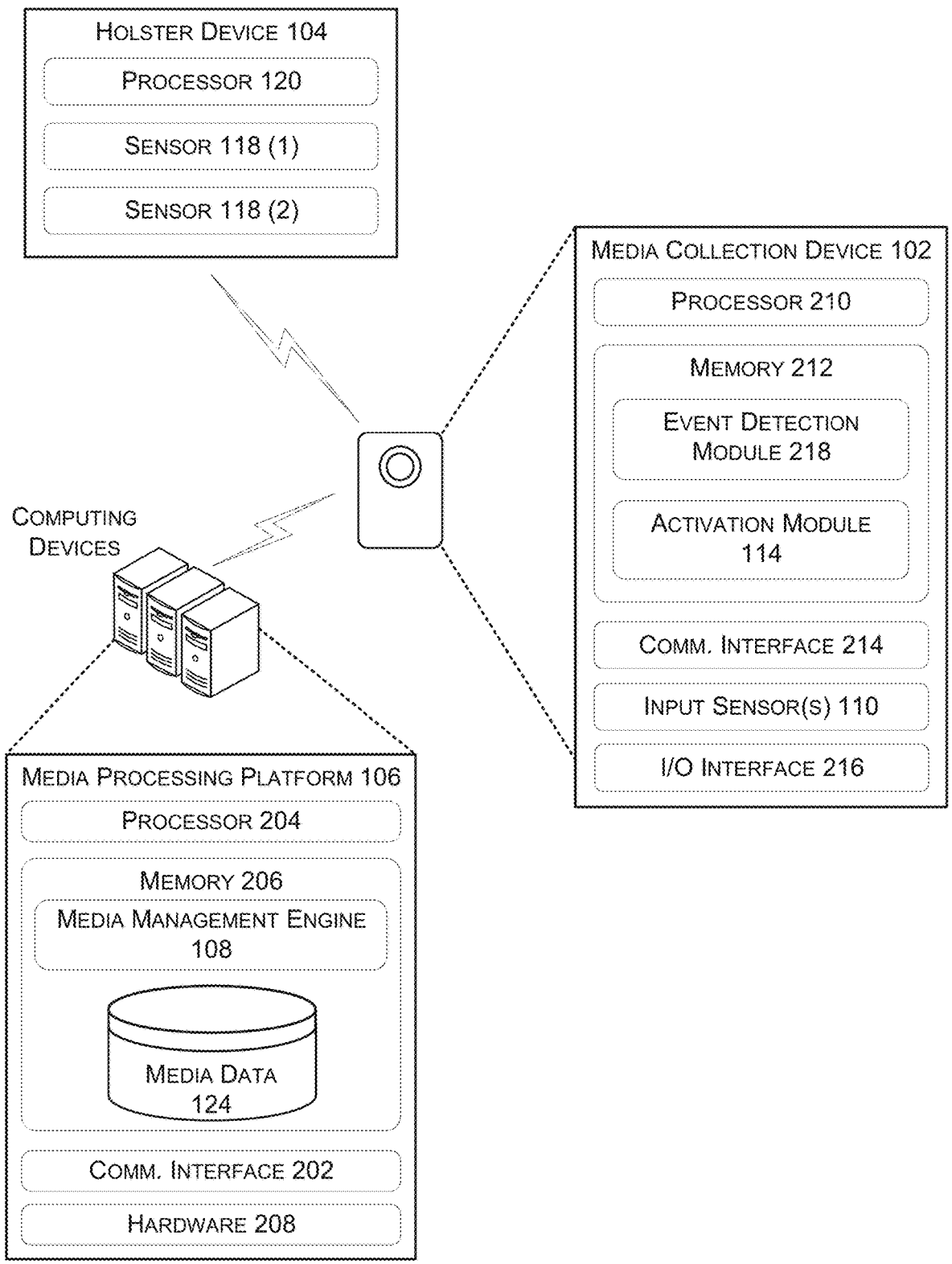
FIG. 2 is a block diagram showing various components of a computing system architecture that supports activation of media content collection based on detection of unholstering events in accordance with various embodiments of the disclosed subject matter.

FIG. 2 is a block diagram showing various components of a computing system architecture that supports activation of media data collection based on detection of unholstering events in accordance with some embodiments. The computing system architecture 200 may include a media processing platform 106 that comprises one or more computing devices. The media processing platform 106 may include a communication interface 202, one or more processors 204, memory 206, and hardware 208. The communication interface 202 may include wireless and/or wired communication components that enable the media processing platform 106 to transmit data to, and receive data from, other networked devices. The hardware 208 may include additional user interface, data communication, or data storage hardware. For example, the user interfaces may include a data output device (e.g., visual display, audio speakers), and one or more data input sensors. The data input sensors may include, but are not limited to, combinations of one or more of keypads, keyboards, mouse devices, touch screens that accept gestures, microphones, voice or speech recognition devices, and any other suitable devices.

The media processing platform 106 can include any suitable computing device or combination of computing devices configured to perform at least a portion of the operations described herein. The media processing platform 106 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The media processing platform 106 can include one or more virtual machines running virtual operating systems, or other computing architectures involving virtualization such as one or more flexible pools of logical storage devices that can be virtualized to maintain virtual storage devices for the computer. For example, the media processing platform 106 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the media processing platform 106 may implement functionality from one or more software modules and data stores. Such software modules may include routines, program instructions, objects, and/or data structures that are executed by the processors 204 to perform particular tasks or implement particular data types. The memory 206 may include at least a module for managing the collection, storage, and use of media content (e.g., media management engine 108). Additionally, the memory 226 may further include a data store of media content received from one or more content capture devices (e.g., media data 124).

In some embodiments, the media management engine 108 may be configured to, in conjunction with the processor 204, process media content in accordance with one or more policies maintained by the media processing platform 106. In some embodiments, the media management engine may be configured to apply one or more procedural rules to received media content, based on one or more attributes of that media content. In some embodiments, the media management engine may be configured to provide the media content to a user (e.g., a reviewer) upon receiving the media content, or upon determining that the received media content meets one or more predetermined conditions (e.g., associated with an upholstering event, etc.). For example, upon determining that a particular media content 112 was received from a content capture device that was automatically activated to record because of an unholstering event (an emergent, priority condition), the media content may be routed to a human operator for independent review.

The communication interface 202 may include wireless and/or wired communication components that enable the media processing platform 106 to transmit or receive data via a network, such as the Internet, to a number of other electronic devices (e.g., content capture device 102). Such a communication interface 202 may include access to both wired and wireless communication mechanisms. In some cases, the media processing platform transmits data to other electronic devices over a long-range communication channel, such as a data communication channel that uses a mobile communications standard (e.g., long-term evolution (LTE)).

The media processing platform 106 may be in communication with one or more content capture devices, including content capture device 102 as described with respect to FIG. 1 above. As mentioned above, a content capture device may be any suitable electronic device capable of obtaining and recording situational data (i.e., content) and that has communication capabilities. The types and/or models of content capture devices may vary. As shown in FIG. 2, the content capture device 102 may include at least a processor 210, a memory 212, a communication interface 214, an I/O interface 216, and at least one input sensor 110. The memory 212 may be implemented using computer-readable media, such as computer storage media.

As noted elsewhere, a content capture device may include one or more input sensors 110. An input sensor may include any device capable of obtaining imagery (stills and video) and/or audio. For example, an input sensor may include a camera device capable of capturing image data and/or a microphone device capable of capturing audio data. In some embodiments, the input sensor may be configured to capture streaming media data (audio and/or video) to be provided to the media processing platform. In some embodiments, the input sensor may be configured to capture media content, such as still images, at periodic intervals. In some cases, the captured media content may be stored locally on the content capture device and uploaded to the media processing platform when a communication channel is established between the two. In some cases, the captured media content may be transmitted to the media processing platform 106 in real-time (e.g., as the media data is captured).

Each content capture device may include an input/output (I/O) interface 216 that enables interaction between the content capture device and a user (e.g., its wearer). Additionally, the content capture device may include a communication interface 214 that enables communication between the content capture device and at least one other electronic device (e.g., the media processing platform 106). Such a communication interface may include some combination of short-range communication mechanisms and long-range communication mechanisms. For example, a content capture device may connect to one or more external devices, including other content capture devices, in its proximity via a short-range communication channel (e.g., Bluetooth®, Bluetooth Low Energy (BLE), Wi-Fi, etc.) and may connect to the media processing platform via a long-range communication channel (e.g., cellular network).

The one or more processors 210 and the memory 212 of the content capture device may implement functionality from one or more software modules and data stores. Such software modules may include routines, program instructions, objects, and/or data structures that are executed by the processors 210 to perform particular tasks or implement particular data types. The memory 212 may include at least a module for initiating or activating collection of media content via the input sensors (e.g., activation module 114) and a module for storing captured content to media data 124 data store (e.g., event detection module 218).

In some embodiments, the activation module 114 may be configured to, in conjunction with the processor 210, activate content collection by the content capture device upon receiving signal data indicating an emergent, priority context. For example, upon receiving signal data from a holster device indicating that a holstered object has been withdrawn, a determination the emergent condition (the unholstering) is a priority condition, and that content collection should be activated. In some embodiments, the activation module 114 may be further configured to deactivate, or cease, collection of media content by the content capture device upon receiving signal data indicating that the emergent condition is a non-priority condition.

In some embodiments, the event detection module 218 may be further configured to, in conjunction with the processor 210, detect one or more activation events from received sensor data. In some embodiments, the activation module may be configured to detect an activation event upon receiving signal data from a holster device and upon determining that a current location of the content capture device is in an area that warrants media collection. For example, if the content capture device is a body-mounted camera worn by a police officer, an activation event may be detected upon receiving signal data (not necessarily a priority context) from a holster device and upon determining that the content capture device is not within an area where unholstering is allowed/expected (e.g., at the precinct or at a firing range, etc.). In some embodiments, an activation event may be generated upon detecting that the object has been withdrawn from the holster at speed that exceeds a threshold speed.

The communication interface 214 may include wireless and/or wired communication components that enable the content capture device to communicate with other electronic devices (e.g., media processing platform 106 and/or holster device 104). Such a communication interface 202 may include access to both wired and wireless communication mechanisms. In some cases, the content capture device transmits data to one or more other electronic devices over a long-range communication channel, such as a data communication channel that uses a mobile communications standard (e.g., long-term evolution (LTE)). In some cases, the content capture device transmits data to one or more other electronic devices over a short-range communication channel (e.g., Bluetooth®, Bluetooth Low Energy (BLE), Wi-Fi, etc.). In some embodiments, the content capture device may use a combination of long-range and short-range communication channels. For example, the content capture device may communicate with a holster device via a short-range communication channel and with a media processing platform via a long-range communication channel.

A holster device 104 may comprise any suitable electronic device/sensor that is configured to detect a presence, or lack thereof, of a metallic object located in or in proximity to the holster device. In some embodiments, detecting a presence or absence of the metallic object may comprise activating one or more sensors 118 (e.g., sensors 118 (1-2)) capable of detecting a metallic object. In some non-limiting examples, the sensors may be inductive proximity sensors capable of detecting the presence of metallic objects. Alternatively, a suitable sensor may be an eddy current sensor capable of measuring displacement of a metallic object.

In some embodiments, the one or more sensors 118 may be located a predetermined distance d apart from each other in proximity to a location into which a metallic object (e.g., a holstered object) is placed. The one or more sensors of the holster device may be in communication with a processor 120 configured to detect an unholstering of the holstered object event during which the metallic object is removed from the location in which the metallic object has been placed. In some embodiments, an unholstering event may be detected when one of the sensors no longer detects the presence of the metallic object. In some embodiments, an unholstering event may be detected when each of the sensors detect the absence of the metallic object and such detections occurs within a predetermined amount of time. For example, signals may be received from each of two separately located sensors. In this example, an unholstering event may be detected if the first signal is received at the processor a predetermined amount of time before the second signal is received.

Figure 3:
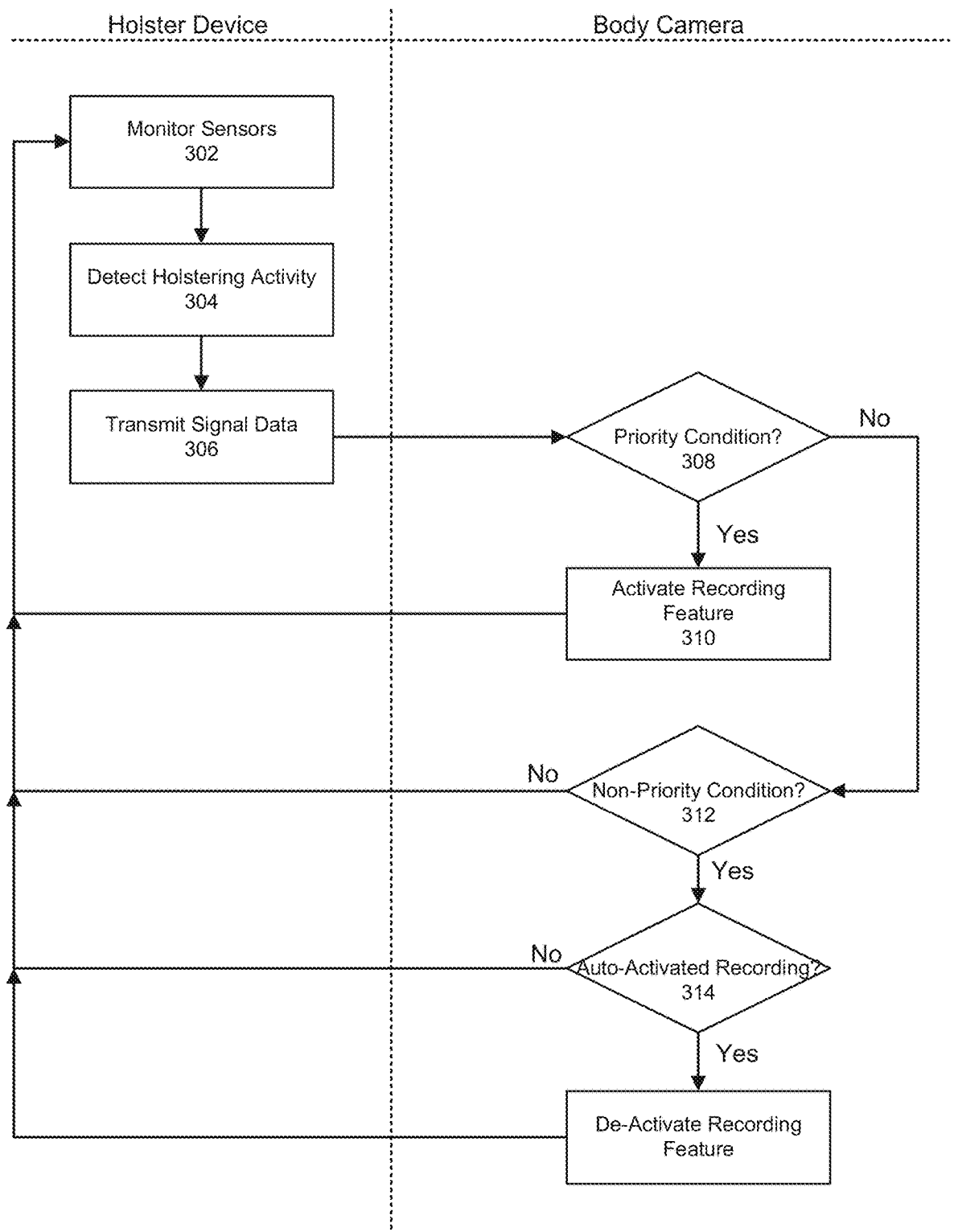
FIG. 3 depicts a block diagram showing an example process flow for providing automated activation of a media collection device in response to detecting an unholstering event in accordance with embodiments of the disclosed subject matter.

FIG. 3 depicts a block diagram showing an example process flow for providing automated activation of a content capture device in response to detecting an unholstering event in accordance with embodiments. The process 300 involves interactions between various components of the architecture 100 described with respect to FIGS. 1 and 2. More particularly, the process 300 involves interactions between at least a media processing platform 106, at least one content capture device 102, and at least one third-party device 106.

At 302 of the process 300, sensor data of the holster device is monitored. As indicated above, in some embodiments, such sensor data may be obtained via one or more sensors installed within a content capture device. For example, sensor data may include data obtained via one or more accelerometers, gyroscopic sensors, or global positioning system (GPS) sensors. Alternatively, in some embodiments, the sensor data may include data obtained from a holster device as described herein. For example, the sensor data may include data received from each of two inductive proximity sensors installed within the holster device. In this example, such data may indicate that a metallic object is proximate to, or is not proximate to, one or both of the inductive proximity sensors.

At 304 of the process 300, "holstering" activity may be detected. In some embodiments, a holstering activity may be unholstering action or a holstering action, each detected upon receiving a signal indicating a change in status with respect to inductive proximity sensors included within the holstering device. For example, such a signal may indicate that one or more of the inductive proximity sensors is no longer in proximity to a metallic surface of an object. In this example, a change in proximity of the sensor to such a surface may result in a change in inductance within a coil of the sensor, resulting in the generation of a current within the coil, which results in the generation of a signal. Based on this signal, a determination may be made as to whether the sensor has moved out of, or into, proximity of a metallic surface.

At 306 of the process 300, signal data indicating the emergent condition, i.e., the holstering activity, is transmitted to the content capture device which, in this example, is a body camera as may be worn by an officer. At 308, a determination may be made as to whether the emergent condition indicated by the signal data corresponds to a priority condition. As indicated above, this may be made according to rules and based on additional information available to the body camera including location of activity, time, or other contextual information.

In some embodiments, this may comprise determining whether the signal data indicates holstering activity having a velocity that exceeds a predetermined threshold speed. For example, the received signal may indicate that a first Sensor A moved out of proximity of a metallic surface of an object at time $T_1$ and a second Sensor B moved out of proximity of a metallic surface of the object at time $T_2$. In this example, Sensor A and Sensor B may be located a distance d apart. Based on this information, a speed of the unholstering event may be determined as $$\text{Speed} = \frac{d}{(T_2 - T_1)}$$

If the determined speed is greater than a threshold speed, then the determination may be made that an activation event has occurred.

In some embodiments, various other factors may be used to determine whether a detected unholstering should be determined to be an activation event. For example, in some cases, an activation event may be detected upon determining that a location of the holster device (or a media device in short-range communication with the holster device) is located in an area that is outside of one or more specified areas within which unholstering is authorized and/or expected (e.g., a police precinct or firearm range). In another example, a time at which the unholstering event takes place may be used to determine whether that unholstering is an activation event.

If, at 308, it is determined that the signal data indicates a priority condition, the process 300 moves to 310 where the recording feature of the content capture device, i.e., the body camera, is automatically activated. After activating the recording feature, the process 300 returns to 302 of the holster device to monitor the sensor data for additional holster activity.

In some embodiments, data received from one or more sensors may be provided to a machine learning model that is trained to correlate such data with activation events. In some embodiments, a determination of an activation event may be made based on information learned about an operator of the media collection device and associated holster device. For example, a particular operator may have a habit of cleaning his or her firearm at a particular time or at a particular location. In this example, an unholstering event that is detected at the particular time or particular location may not trigger an activation event. In some embodiments, a threshold speed may be determined on an operator-by-operator basis. For example, a machine learning model may be trained to identify a speed at which an operator typically unholsters his or her weapon (e.g., a holstered object) during a non-combat scenario. This unholstering speed (i.e., the speed at which the weapon is withdrawn from its holster), plus or minus some variance, may be used as a threshold unholstering speed when determining whether an unholstering event associated with that operator warrants an activation event.

If, at 308, there is not a priority condition, then the process may move to 312. At 312, a determination is made as to whether the signal data indicates a non-priority condition. If the indicated condition is not a non-priority condition, the process returns to 302 for monitoring the sensor data. Alternative if the indicated condition is a non-priority condition, the process moves to 314.

At 314, if the recording feature of the content collection device, i.e., the body camera, was automatically activated, the process proceeds to 316 where the recording feature of the content collection device is de-activated. Alternatively, if the recording feature of the content collection device was not automatically activated, the process 300 returns to 302 to monitor the holster sensors.

Figure 4:
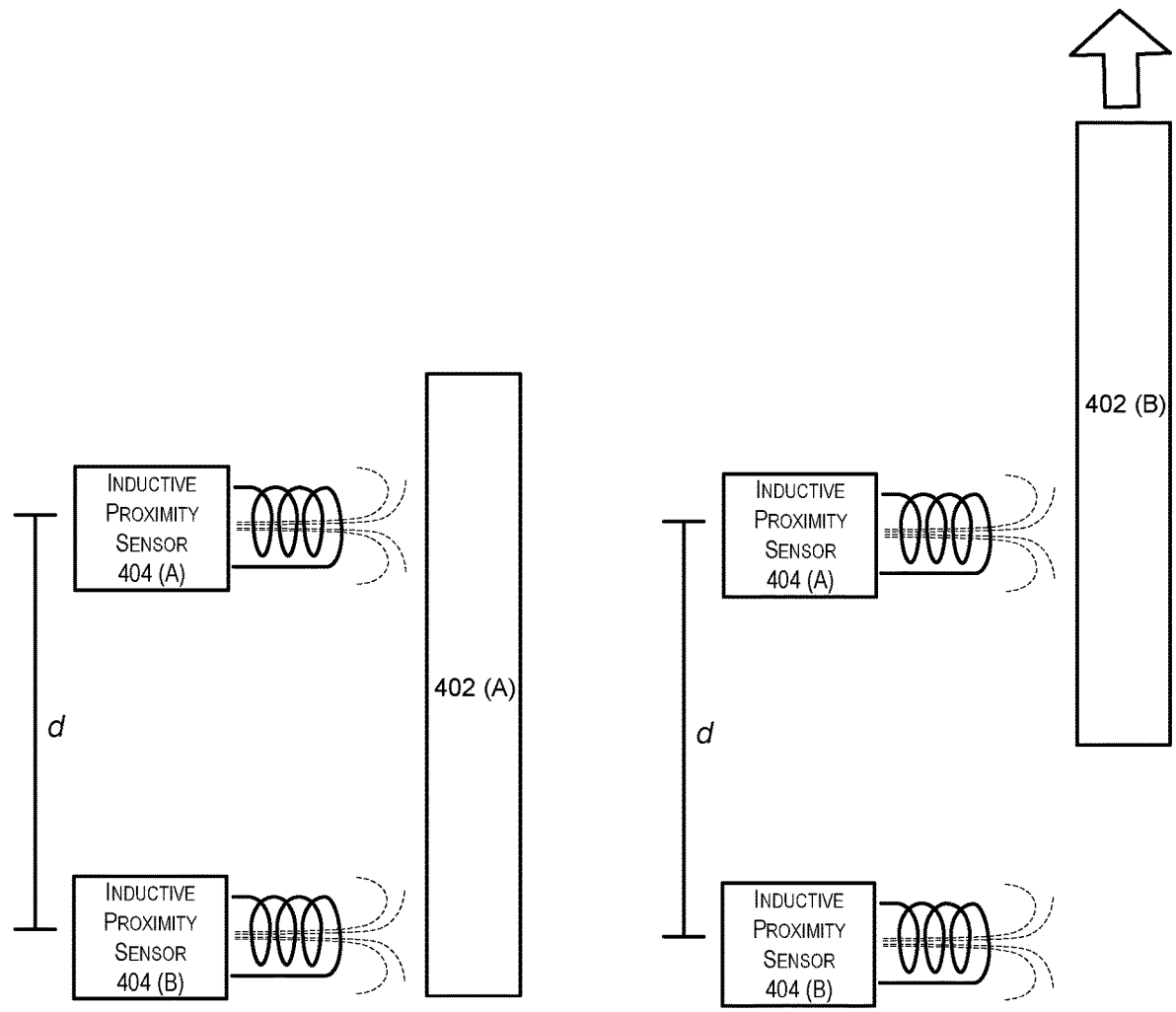
FIG. 4 depicts an example of a sensor configuration that may be implemented within a holster device in accordance with at least some embodiments of the disclosed subject matter.

FIG. 4 depicts an example of a sensor configuration that may be implemented within a holster device in accordance with at least some embodiments. In FIG. 4, a metallic object 402 is depicted in a first position at 402(A) and in a second position at 402(B). The metallic object 402, which may be a weapon such as a firearm or blade, may be fitted into a slot or other securing mechanism that positions the metallic object in proximity to two sensors 404(A) and 404(B). The two sensors 404(A) and 404(B) may be positioned equidistant from the metallic object and a distance d apart.

By way of non-limiting example, the sensors 404 may be inductive proximity sensors. Inductive proximity sensors operate under the electrical principle of inductance. Inductance is the phenomenon where a fluctuating current, which by definition has a magnetic component, induces an electromotive force (emf) in a target object. To amplify a device's inductance effect, the sensor may include wire twisted into a tight coil through which a current is run.

An inductive proximity sensor typically has four components: a coil, an oscillator, a detection circuit, and an output circuit. The oscillator generates a fluctuating magnetic field the shape of a doughnut around the winding of the coil that locates in the sensor's sensing face.

When a metal object moves into the inductive proximity sensor's field of detection, eddy circuits build up in the metallic object, magnetically push back, and finally reduce the inductive sensor's own oscillation field. The sensor's detection circuit monitors the oscillator's strength and triggers an output from the output circuitry when the oscillator becomes reduced to a sufficient level. In this manner, an inductive proximity sensor can be configured to detect events in which a metallic object is removed from, or placed within, its proximity.

When the metallic object is in a first position 402(A) in which it is fully holstered, a surface of the metallic object may be exposed to each of the two sensors 404 A and 404 B. However, when the object begins to be withdrawn from its holster, as illustrated by the metallic object at position 402(B), then one of the sensors (404(B)) will detect that the metallic object is no longer in its proximity before the other sensor (404(A)). Accordingly, a speed at which the metallic object has been withdrawn from the holster may then be determined as a function of the distance between the sensors 404A and 404B as well as the time at which each of those sensors detects that the metallic object has left its proximity.

Figure 5:
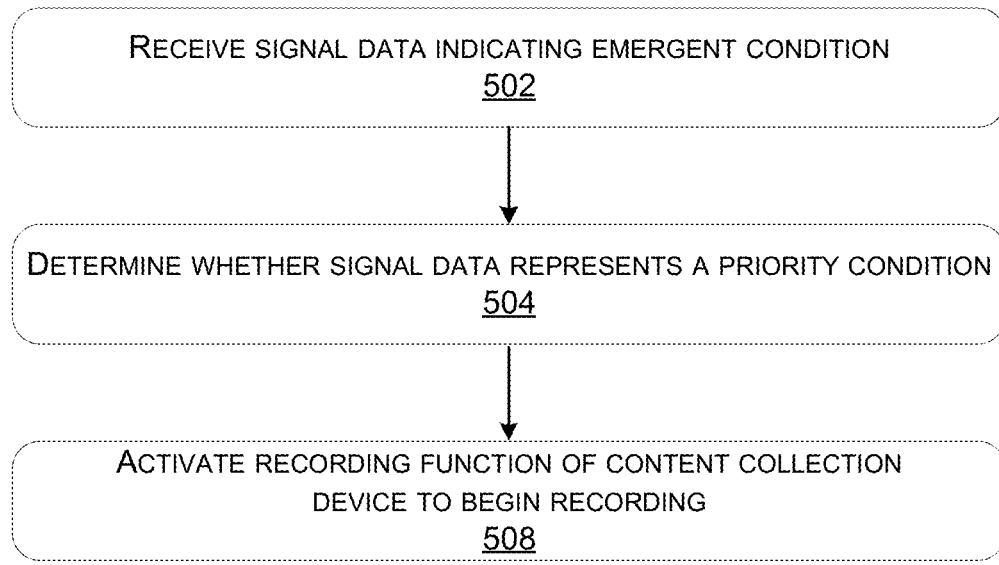
FIG. 5 depicts a block diagram showing an example process flow for correlating audio data with objects depicted within a media data in accordance with embodiments of the disclosed subject matter.

FIG. 5 depicts a block diagram showing an example process flow for automatically capturing or recording media content based on notification of a priority condition. For example, the process 500 may be performed by a system that comprises a content collection device 102 in communication with other devices or components, at least some of which are capable of transmitting signal data of emergent conditions. Each of the components in such a system may include a communication interface that enables communication between itself and one or more other electronic devices in the system.

In some embodiments, the process 500 is performed in a memory of content capture device. In these embodiments, the content capture device may receive signal data indicating an emergent condition. As indicated above, emergent conditions indicate some particular change or update to conditions for which content collection may be appropriate. Emergent conditions may be, but are not always, priority conditions for which automatic recordation of content is warranted. By way of illustration and not limitation, an emergent condition may correspond to an unholstering of a device, sensing the arrival within geographic proximity of a location, association with a dispatched event, and the like. Signal data of emergent conditions may be received from a various of sensors as well as being generated by one or more persons.

At 502, the process 500 comprises received signal data from one or more sources, including radio dispatch, local sensors, and the like. As discussed above, the signal data may be transmitted from a holster device when holstering activity occurs. The signal data is indicative of an emergent condition, e.g., holstering activity, arrival in geographic proximity of an event, another officer firing a weapon, etc., At 504, the process 500 comprises determining, based on the received signal data, that the emergent condition is a priority condition that would lead to automatic activation of recording by a content capture device. As indicated above, the emergent condition, by itself, may indicate a priority condition. By way of illustration and not limitation, this may occur when dispatch sends a signal to an officer's body camera to commence recording and live-streaming video. Additionally, or alternatively, a priority condition may be determined according to the emergent condition of the signal data in conjunction with additional content and rules that may be applied. For example, and by way of illustration and not limitation, unholstering a handgun at a certain rate of speed, or when the officer is in the station or off-duty, may or may not lead to a priority condition determination. Further, the determination as to whether media content should be collected may be made based on a number of additional factors. In some embodiments, a determination that media content should be collected is also made based on a current location of the media collection device. In some cases, a determination is made that media content should be collected if the current location of the media collection device is not within a whitelist of locations. For example, the system may maintain a list of locations or areas within which, if an unholstering event occurs, an activation event may not be triggered unless other conditions are present. In some cases, a determination is made that media content should be collected if the current location of the media collection device is within a blacklist of locations. For example, the system may maintain a list of locations or areas within which, if an unholstering event occurs, an activation event may be triggered regardless of other conditions present.

At 506, the process 500 comprises, after determining that a priority condition exists, automatically activating the recording feature of the content capture device.

Figure 6:
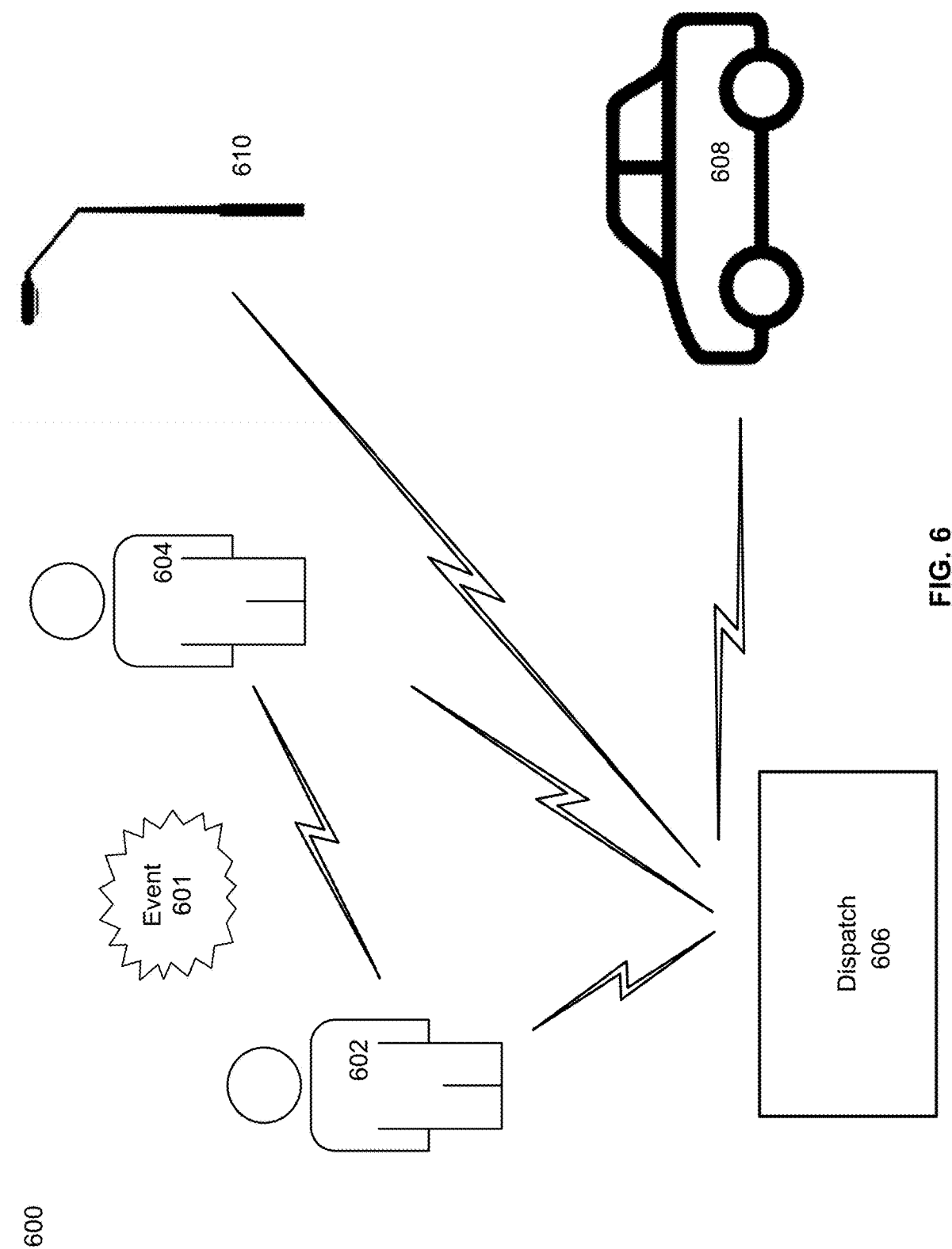
FIG. 6 illustrates an exemplary environment 600 in which the emergent conditions for a first person, such as a police officer, may result in the activation of the recording feature of content capture devices associated with other persons and devices.

FIG. 6 is a diagram illustrating an exemplary environment 600 in which the emergent conditions for a first person, such as a police officer, may result in the activation of the recording feature of content capture devices associated with other persons and devices. This environment 600 is described in the context of officers and devices and an event that has a geographic position 601. In this example, at least 2 officers 602 and 604, are in proximity to the event. Additionally, a streetlamp 610 configured with a content capture device is also within a geographic proximity of the event 601. A dispatch office 606 may be communication with the officers 602 and 604 and may also have communication access to the streetlamp and well as other officers that may be in-route as indicated by vehicle 608.

Assume that officer 602 withdraws a CED from a holster at the event 601. Assume that this represents a priority condition which is sent (as signal data) from the holster to the body camera (a content capture device) of officer 602, and results in automatically activating the recording feature of that device. According to aspects of the disclosed subject matter, the withdrawal/unholstering by officer 602 also causes signal data to be transmitted, directly or indirectly, to the body camera of officer 604. This transmission may occur over BLE or other protocol, which representing a priority condition, causes the body camera of officer 604 to activate the recording feature of the device. Assuming further that the signal data is received by dispatch 606 which relays the signal data to devices in the area of the event 601, including the streetlight 610 and this signal data causes automatic activation of video streaming which is captured by dispatch. Further still, dispatch 606 transmits the signal data to the officer in patrol car 608. This, being a priority event as that officer is dispatched to the event 601, causes the activation of the record feature of the cameras on the vehicle as well as the body camera of that officer.

As per the example above, the broadcast of the signal data to other devices and/or persons may result in content capture devices associated with an event and within geographic proximity to begin recording and/or live-streaming media data. This results in improved data capture relating to event 601.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method implemented by a content capture device, comprising:
    obtaining, from one or more sensors, signal data corresponding to an emergent condition, wherein:
        the emergent condition is determined according to first data of a first sensor indicating that an object has left the proximity of the first sensor, and second data of a second sensor indicating that the object has left the proximity of the second sensor, and
        the emergent condition is a speed at which the object is being moved based upon a first time associated with the first data, a second time associated with the second data, and a distance between the first sensor and the second sensor;
    determining whether the emergent condition is a priority condition; and
    upon determining that the emergent condition is a priority condition:
        automatically activating a media capture function of the content capture device; and
        causing at least some media to be captured by the content capture device.

2. The method of claim 1, wherein:
    the first and second sensors are two of a plurality of sensors in a holster device in which a position of the object is sensed.

3. The method of claim 1, wherein determining that the emergent condition is a priority condition is based at least in part on whether the speed at which the object is being withdrawn from the holster device is greater than a threshold speed value.

4. The method of claim 3, wherein the threshold speed value is determined based on an operator of the holster device.

5. The method of claim 1, wherein determining that the emergent condition is a priority condition is based, at least in part, on a current location of the content capture device relative to an event location.

6. The method of claim 5, wherein determining that the emergent condition is a priority condition is based, at least in part, on whether the current location of the content capture device is within a whitelist of locations.

7. The method of claim 5, wherein determining that the emergent condition is a priority condition is based, at least in part, on whether the current location of the content capture device is within a blacklist of locations.

8. The method of claim 1, wherein the method is performed by a processor in a memory of the content capture device.

9. The method of claim 1, wherein the method is performed on a server computing device located remote to the holster device, the server computing device receiving the signal data via a long-range communication channel.

10. A method implemented on a first content capture device associated with a first person, comprising:
    receiving signal data from a source other than a device, including the first content capture device, associated with the first person, the signal data corresponding to an emergent condition, wherein:
        the emergent condition is determined according to first data of a first sensor indicating that an object has left the proximity of the first sensor, and second data of a second sensor indicating that the object has left the proximity of the second sensor, and the emergent condition is a speed at which the object is being moved based upon a first time associated with the first data, a second time associated with the second data, and a distance between the first sensor and the second sensor;

determining whether the emergent condition is a priority condition; and upon determining that the emergent condition is a priority condition:

automatically activating a media capture function of the first content capture device; and causing at least some media to be captured by the first content capture device.

11. The method of claim 10, wherein the emergent condition is based on sensor data from a device associated with a second person to the first person.

12. The method of claim 11, wherein the emergent condition corresponds to at least two sensors of a holster device associated with the second person detecting the withdrawal of an object from the holster device.

13. The method of claim 10, wherein determining that the emergent condition is a priority condition is based on an assignment of the first person to an event.

14. The method of claim 10, wherein determining that the emergent condition is a priority condition is based on a geographic proximity of the first person to an event.

15. The method of claim 10, wherein determining that the emergent condition is a priority condition is based on an instruction from a dispatch center to capture content of an event.

16. A content capture device associated with a first person, comprising:

a memory that stores processor-executable instructions and further stores media content captured by one or more media capture sensors;

a processor suitable for executing processor-executable instructions from the memory to automatically capture content upon a determination of a priority context;

a content capture sensor that is configured to capture multimedia content; and a communication component configured to receive signal data corresponding to an emergent context, wherein:

the emergent context is determined according to first data of a first sensor indicating that an object has left the proximity of the first sensor, and second data of a second sensor indicating that the object has left the proximity of the second sensor, and the emergent context is a speed at which the object is being moved based upon a first time associated with the first data, a second time associated with the second data, and a distance between the first sensor and the second sensor;

wherein the content capture device, upon receiving signal data, is configured to execute processor-executable instructions by the processor to determine whether the emergent context is a priority context, and upon determining that the emergent context is a priority context, the content capture device is further configured to:

automatically activate the content capture sensor to capture multimedia content; and store at least some captured multimedia content in the memory.

17. The content capture device of claim 16, wherein the received signal data corresponds to an emergent context based on sensor data from a device associated with a second person other than the first person.

18. The content capture device of claim 16, wherein the content capture device determines that the emergent context is a priority context according to an assignment of the first person to an event.

19. The content capture device of claim 16, wherein the content capture device determines that the emergent context is a priority context according to a geographic proximity of the first person to an event.

20. The content capture device of claim 16, wherein:

determining that the emergent context is a priority context is based, at least in part, on a current location of the content capture device relative to an event location; and determining that the emergent context is a priority context is based, at least in part, on whether the current location of the content capture device is within a blacklist of locations.

* * * * *